United States Patent
Fukuda et al.

(10) Patent No.: US 8,175,121 B2
(45) Date of Patent: May 8, 2012

(54) IMAGE PROCESSOR AND IMAGE DISPLAY APPARATUS COMPRISING THE SAME

(75) Inventors: Nobuhiro Fukuda, Tokyo (JP); Masahiro Ogino, Ebina (JP); Yoshiaki Mizuhashi, Yokohama (JP); Takashi Oyama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1112 days.

(21) Appl. No.: 11/960,828

(22) Filed: Dec. 20, 2007

(65) Prior Publication Data

US 2008/0211968 A1   Sep. 4, 2008

(30) Foreign Application Priority Data

Dec. 28, 2006   (JP) .................................. 2006-353700

(51) Int. Cl.
*H04J 3/06*   (2006.01)
(52) U.S. Cl. .............. 370/503; 375/240.01; 375/240.27; 375/240.29; 348/441; 348/443; 348/699
(58) Field of Classification Search ............. 375/240.01, 375/240.27, 240.29; 345/474; 348/441, 348/443, 699
See application file for complete search history.

(56) References Cited

U.S. PATENT DOCUMENTS

| 5,153,719 A | 10/1992 | Ibenthal |
| 5,805,736 A | 9/1998 | Kim |
| 6,661,470 B1 * | 12/2003 | Kawakami et al. ........... 348/699 |
| 7,167,522 B2 * | 1/2007 | Webb ........................ 375/240.29 |
| 2004/0027454 A1 * | 2/2004 | Vella et al. ..................... 348/155 |
| 2007/0110161 A1 * | 5/2007 | Saigo et al. ............... 375/240.16 |
| 2009/0073311 A1 * | 3/2009 | Hamada et al. ................ 348/441 |

FOREIGN PATENT DOCUMENTS

| CN | 1168057 | 12/1997 |
| EP | 1 667 093 A2 | 6/2006 |
| JP | H4-234276 | 8/1992 |
| JP | H8-149510 | 6/1996 |
| JP | 2003-304507 | 10/2003 |
| JP | 2006-165602 | 6/2006 |
| JP | 2007-235403 | 9/2007 |
| WO | WO 2006/117878 | 9/2006 |

* cited by examiner

*Primary Examiner* — Seema S Rao
*Assistant Examiner* — Wanda Russell
(74) *Attorney, Agent, or Firm* — Antonelli, Terry, Stout & Kraus, LLP.

(57) ABSTRACT

An image processor includes a motion vector acquisition section for acquiring and outputting an image motion vector in pixel or a predetermined block unit from plural frames included in an input image signal; and a frame interpolation section for generating an interpolated frame by using the motion vector provided by the motion vector acquisition section and for combining the interpolated frame with a frame of the input image signal, thereby composing a signal of a new frame sequence. The motion vector acquisition section includes a first motion vector acquisition section acquiring a motion vector by matching process and a second motion vector acquisition section acquiring a motion vector based on a relative misalignment of a predetermined edge component between two temporally successive frames in a specific area of an input image signal's frame.

17 Claims, 12 Drawing Sheets

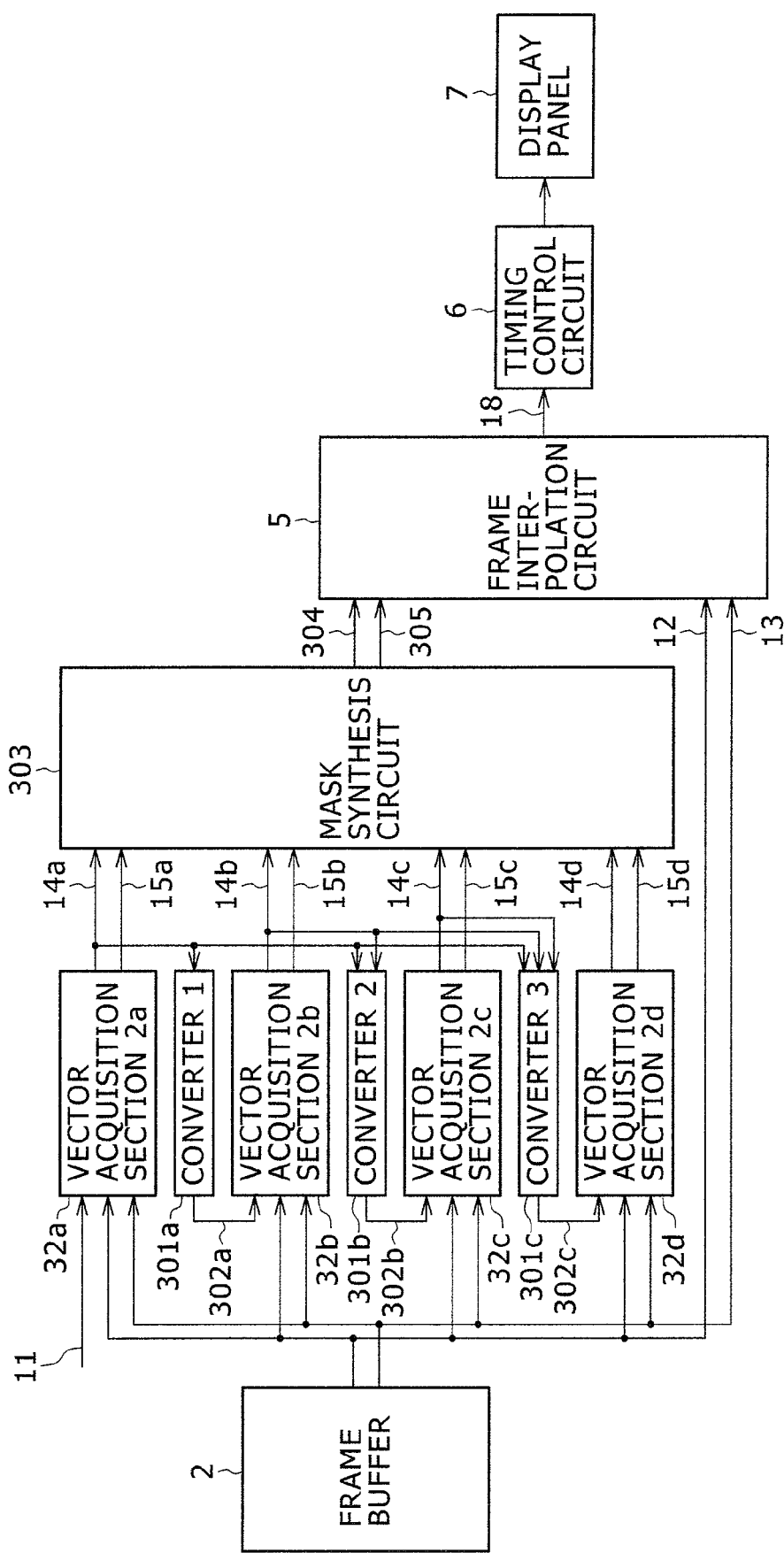

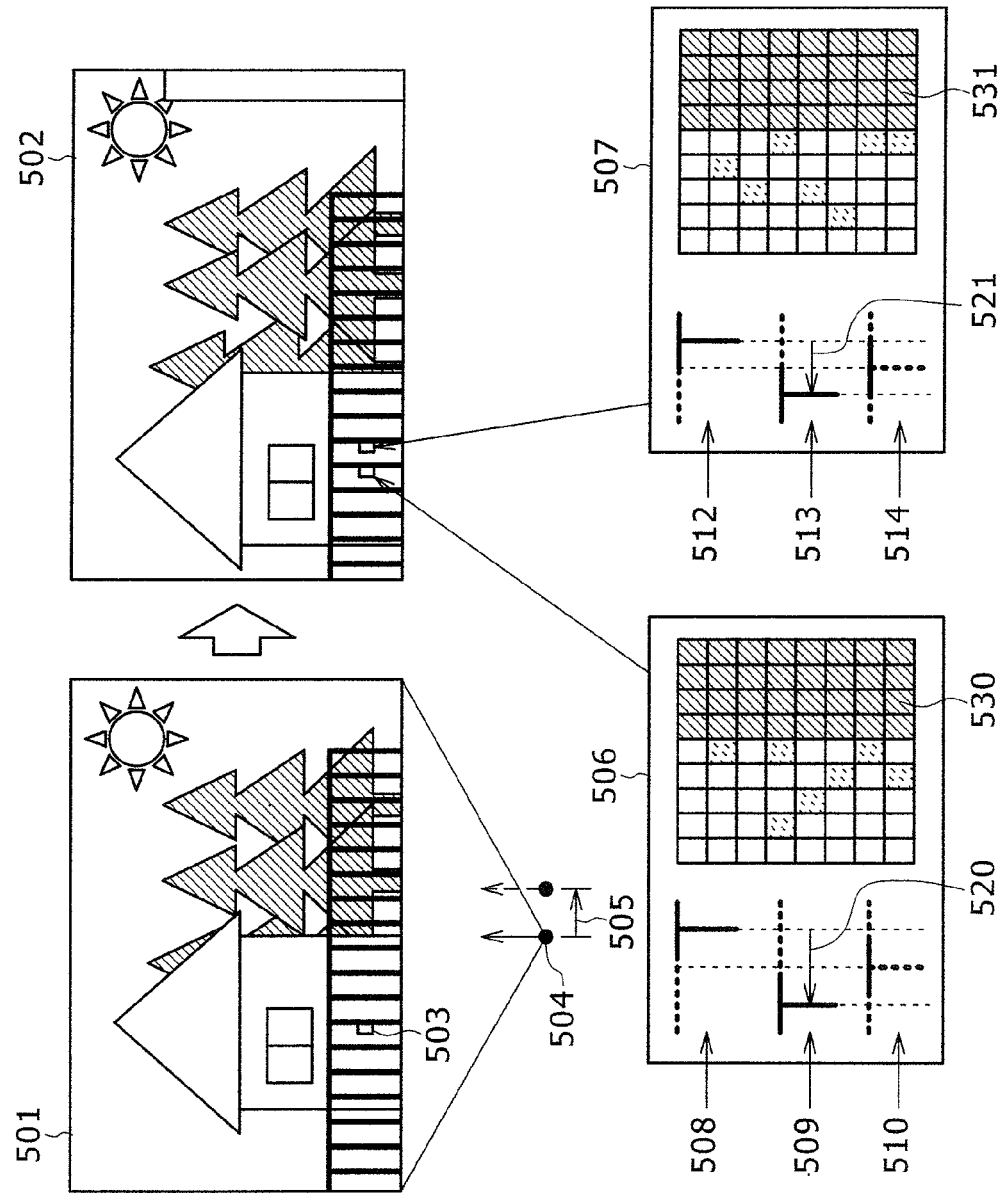

IMAGE PROCESSOR AND IMAGE DISPLAY APPARATUS COMPRISING THE SAME

CLAIM OR PRIORITY

The present application claims priority for Japanese application serial No. JP 2006-353700, filed on Dec. 28, 2006, the content of which is hereby incorporated by reference into this application.

BACKGROUND OF THE INVENTION (1) Field of the Invention

The present invention relates to an image processor and an image display apparatus; and, more particularly, to an image processor that includes a configuration for converting frame rate of an input image signal and an image display apparatus.

(2) Description of the Related Art

A technique called frame rate conversion has been recently introduced for offering better moving image performance. It uses frames included in an image signal and a motion vector of the input image signal and combines interpolation frames created in an apparatus to generate a signal of a new frame sequence. Accordingly, it becomes possible to offer better moving image performance by improving unnatural motion such as a feeling of afterimage or unstable image in a display of moving images.

In order to improve moving image performance more, it is necessary to generate an interpolation frame with high accuracy. This in turn requires raising the detection accuracy for a motion vector used to generate an interpolation frame. A prior art technique related to the improvement of the detection accuracy for a motion vector is disclosed in Japanese Patent Application Publication No. 2006-165602, for example. The technique involves inserting an interpolation frame between two temporally successive frames included in an input image signal. In detail, plural frame pixel pairs at point symmetric positions about an interpolated pixel that constitutes the interpolation frame are extracted from a predetermined area, and a pixel direction having a minimum difference between the pixels is designated as a motion vector.

SUMMARY OF THE INVENTION

As aforementioned, the prior art technique designates a motion vector in a direction where a difference between previous and subsequent frame pixels (blocks) at point symmetric positions about the interpolated pixel (hereinafter, this process is called a matching process) is minimal. Therefore, in the case that only one or two edge components of a certain level appear in the predetermined area, the number of pixel pairs having the minimum difference is small so it is relatively easy to specify the motion of an object. However, as for an image pattern where change in brightness such as a wire-netting (mesh) pattern, a stripe pattern, a grid pattern, telop characters, etc., appears periodically or non-periodically, edge components having the same level often appear in a designated direction (horizontal or vertical direction) in the predetermined area. Consequently, a number of pixel pairs having the minimum difference appear in the predetermined area, causing erroneous detection of a motion vector.

For example, in the case that a certain stripe pattern moves throughout two temporally successive frames, i.e., from a previous frame to a subsequent frame, one of the sticks or even an adjacent stick in the subsequent frame has the same pixel value as one of the sticks in the previous frame. Therefore, a detection error occurs by regarding one of the sticks in the previous frame has moved to the adjacent stick in the subsequent frame.

To elaborate this phenomenon in reference to FIG. 5, an image in the upper left corner indicates an image of a temporally previous frame (the first frame) out of two successive frames, and an image in the upper right corner indicates an image of a temporally subsequent frame (the second frame) out of the two frames. This image contains, besides a house, trees and so forth, a stripe pattern where change in brightness appears periodically in a horizontal direction. Suppose that the image of the first frame was photographed at a position of a camera 504, and that the camera 504 moved in a direction 505 to photograph the image of the second frame. That is, a motion vector of an image between the first frame and the second frame becomes opposite to the direction 505.

Suppose that a target area 503 of the first frame actually moved to an area 506 in the subsequent frame. If a motion vector is detected accurately from the matching process and an interpolation frame is composed accordingly, it appears in the lower left corner. That is, a stripe pattern 508 in the previous frame of the target area 503 moves in the direction of the motion vector 520 to a stripe pattern 509 in the subsequent frame, a stripe pattern 510 is generated as an interpolation frame by the matching process. At this time, an enlarged image in the area 506 is denoted by reference numeral 530. However, since a stripe pattern, as shown in an enlarged image 531, has the same pixel value as that of the enlarged image 530, it is erroneously detected that the stripe pattern has moved to the area 507, not the area 506. In this case, as shown in the lower right corner of FIG. 5, the matching process may be performed incorrectly by concluding that the stripe pattern 508 in the previous frame of the target area 503 has moved to a stripe pattern 513 in the subsequent frame by an erroneously detected vector 521. At this time, a stripe pattern in the interpolation frame is denoted by reference numeral 514, appearing at a different position from the stripe pattern 510 of the interpolated frame that was generated out of an accurately detected motion.

When such a detection error of the motion vector occurs, an image of no relationship with motion or an image with low relationship appears on an interpolation frame, resultantly producing a broken, jitter image.

The above related art does not consider erroneous detection of a motion vector in an image pattern where such change in brightness appears periodically or non-periodically, or a broken, jitter image due to an interpolation frame generated by the erroneously detected motion vector.

In view of the foregoing disadvantages and problems, it is, therefore, an object of the present invention to provide a frame conversion technology in use of an interpolation frame, capable of displaying a high picture quality image with less jitter or break-ups even for an image pattern where change in brightness such as a grid pattern, a stripe pattern and so on appears periodically or non-periodically.

To achieve the above object, the present invention is characterized in the configuration described in the claims.

There is provided an image processor, which designates an area with an image pattern having a periodically or non-periodically appearing brightness change such as a grid pattern, a stripe pattern, telop characters, etc., as a specific area and acquires a motion vector for the specific area by using an amount of relative misalignment of a predetermined edge component between two temporally successive frames in an input image signal.

In detail, the matching process described above assigns a motion vector to other areas except for the specific area.

Meanwhile, a motion vector for the specific area is given by the following process. That is, two frames in a predetermined pixel unit shift relatively in a horizontal and/or vertical direction, and a frequency where the predetermined edge components coincide with each other between the two frames is detected per shift to compose a histogram. Then, a shift quantity (an amount of misalignment) with the highest frequency where the predetermined edge components coincide with each other is designated as a motion vector for the specific area.

Accordingly, the image processor of the invention incorporating a frame conversion technology in use of an interpolation frame is capable of displaying a high picture quality image with less jitter or break-ups even for an image pattern where change in brightness such as a grid pattern, a stripe pattern and so on appears periodically or non-periodically.

BRIEF DESCRIPTION OF THE DRAWINGS

These and other features, objects and advantages of the present invention will become more apparent from the following description when taken in conjunction with the accompanying drawings wherein:

FIG. 3 is a block diagram illustrating a configuration of a display apparatus according to a second embodiment of the present invention;

FIG. 5 is a diagram showing one example of problems found in prior art technologies;

DETAILED DESCRIPTION OF THE PREFERRED EMBODIMENT

A preferred embodiment of the present invention will now be described with reference to the accompanying drawings. In addition, the embodiment may be applied not only to convert the frame rate of an input signal from 60 Hz to its twice, 120 Hz, for example, but also to convert a 2-3 pull down mode input image signal having the frame rate of 60 Hz to a 60 Hz non-pull down mode image signal by substituting an interpolation frame for several frames in the input image signal.

[Embodiment I]

Figure 1:
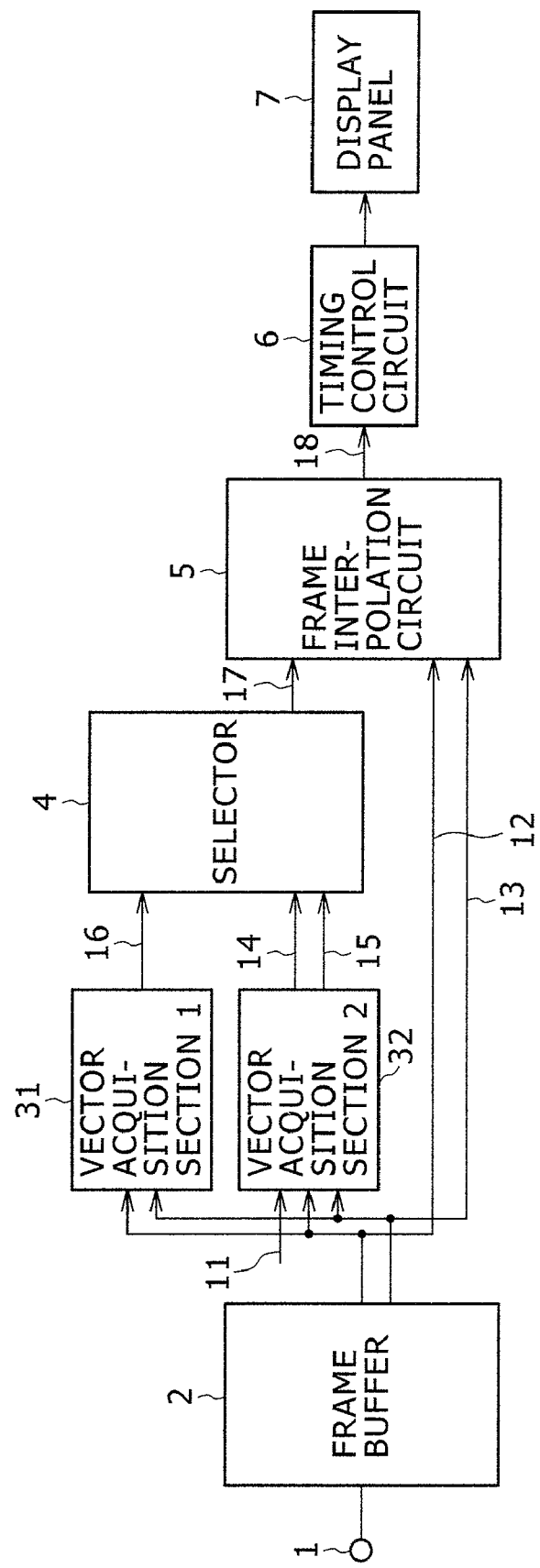
FIG. 1 is a block diagram illustrating a configuration of a display apparatus according to a first embodiment of the present invention.

A first embodiment of the invention will be described with reference to FIGS. 1 and 2. FIG. 1 shows an image processor according to a first embodiment of the present invention, or a structural view of one example of an image display apparatus having a display panel 6 to which the present invention is applied.

An image signal is inputted to an input terminal 1, and frame data corresponding to at least two of the input image signals is stored in a frame buffer 2. Accordingly, the frame buffer 2 outputs a previous frame 12 that is temporally ahead and a subsequent frame 13 that is temporally behind the previous frame. The previous frame 12 and the subsequent frame 13 are respectively inputted to a first motion vector acquisition section 31, a second motion vector acquisition section 32, and a frame interpolation circuit 5.

Figure 13:
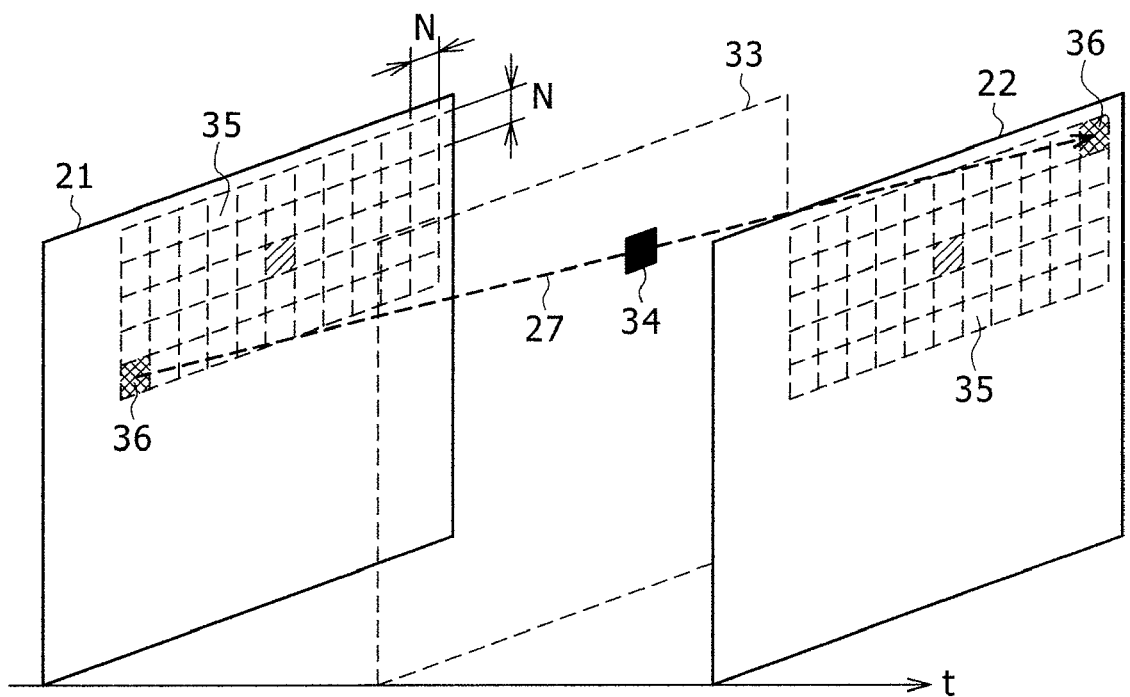
FIG. 13 illustrates one example of a motion vector obtained by a matching process.

The first motion vector detection section 31 detects a motion vector by the matching process described above from the previous and subsequent frames 12 and 13 being inputted. The matching process is now described with an example shown in FIG. 13. In detail, FIG. 13 illustrates frame rate conversion from 60 Hz to 120 Hz for example as in a case where one piece of interpolation frame is inserted to a centroid which is a temporal center between two original frames in an input image signal. Another form of frame rate conversion is subjected to basically the same process.

As shown in FIG. 13, in the case of interpolating (composing an interpolated pixel) a target block (this could be a pixel) 34 on an interpolation frame 33, a search domain 35 with a predetermined number of blocks indicated by the dotted line is prepared for a subsequent frame signal 21 and a previous frame signal 22, respectively, with respect to a block at the same spatial position as the target block 34. In an example shown in FIG. 13, the search domain 35 is formed of 11 blocks in the horizontal direction and 5 blocks in the vertical direction. Next, a block on the subsequent frame signal 21 and a block on the previous frame signal 22, which are point symmetric in a temporal direction with respect to the target block 34, are extracted in form of a block set. This extraction of a block pair is carried out for every block in the search domain 35 to obtain a difference between each pair of blocks. A block pair 36 having a smallest difference is detected, and a straight line connecting the block pair is detected as a first motion vector 16.

Meanwhile, the second motion vector acquisition section 32 is the key feature of this embodiment and acquires a motion vector by a different approach from the matching process used for the first motion vector acquisition section. For instance, the second motion vector acquisition section 32 carries out a process for giving a second motion vector 14 that is different from the first motion vector 16 to a specific area having an image pattern with a periodically appearing brightness change such as a grid pattern, a stripe pattern, etc., among images in one frame. In detail, a predetermined edge component is detected or filtered from the subsequent frame signal 21 and the previous frame signal 22, respectively. And while these frames are moving (shifting) relatively in the horizontal and/or vertical direction, the number of times (the frequency of appearance) a coincidence point where the predetermined edge components of the subsequent and previous frame signals 21 and 22 coincide with each other occurs is counted per shift. Based on the count number, a histogram showing the distribution of coincidence points per shift is plotted, and a shift with the highest frequency appearance of the coincidence point is designated as a motion vector for the specific area. More details on this will follow later. In the meantime, referring back to FIG. 1, a mask signal 11 is inputted to the second motion vector acquisition section 32, and a mask area specified by this mask signal 11 is not subjected to the process described earlier. An example of the mask area will be an area displaying a control board or a menu screen generated by OSD circuit (not shown).

Moreover, the second motion vector acquisition section 32 of this embodiment discriminates a specific area from the filtered predetermined edge components to output an area identification signal 15. Here, the area identification signal 15 outputs a signal "1" if a certain pixel is included in the specific area for example. Otherwise, the area identification signal 15 outputs "0" for the other cases. The discrimination of a specific area will also be explained further.

The first motion vector 16 outputted from the first motion vector acquisition section 31, and the second motion vector 14 and the area identification signal 15 both being outputted from the second motion vector acquisition section 32 are inputted to a selector 4. The selector 4 selects one of the first motion vector 16 and the second motion vector 14, according to a value of the area identification signal 15. In other words, if the area identification signal 15 is "1", the selector 4 selects the second motion vector 14 for pixel interpolation in a specific area; otherwise selects the first motion vector 16 for pixel interpolation in areas other than the specific area, and outputs a selected motion vector 17.

The selected motion vector 17 from the selector 4 is inputted to a frame interpolation circuit 5. As mentioned earlier, the frame interpolation circuit 5 also receives signals from the previous and subsequent frames 12 and 13. And the frame interpolation circuit 5 computes a pixel value of the target block (or pixel) 34 among the interpolation frames 33 shown in FIG. 13 for example as the mean of the pixel values of the previous and subsequent frames 12 and 13 which the selected motion vector 17 indicates while passing by the target block 34. In this manner, an interpolated pixel in the interpolation frame 33 is obtained. The frame interpolation circuit 5 performs this process on every pixel in the interpolation frame to compose one piece of an interpolated frame. Further, the frame interpolation circuit 5 combines the interpolated frame and an original input frame to output a signal 18 in a new frame sequence. This combination step includes, for example, inserting an interpolated frame between two temporally successive original frames. In addition, the combination step also includes substituting several original frames existing between the two original frames with interpolated frames.

The signal 18 in a new frame sequence is provided to a display panel 7 via a timing control circuit 6. The display panel 7 may be an LCD panel or a PDP. The timing control circuit 6 feeds an output signal from the frame interpolation circuit 5 to the display panel 7 according to horizontal or vertical scan timing, so that a frame rate converted image may be displayed on a screen of the display panel 7.

The first motion vector acquisition section 31 and the frame interpolation circuit 5 may be configured as two separate units as in this embodiment, or in one unit. For instance, the first motion vector acquisition section 31 may be built in the frame interpolation circuit 5 to extract a first motion vector by the above-described matching process from the previous frame signal 12 and the subsequent frame signal 13 being inputted to the frame interpolation circuit 5. In this case, the selector 4 is not required, and the first motion vector is substituted with the second motion vector 14 according to the area identification signal 15 (i.e., for a pixel with the area identification signal "1").

Figure 2:
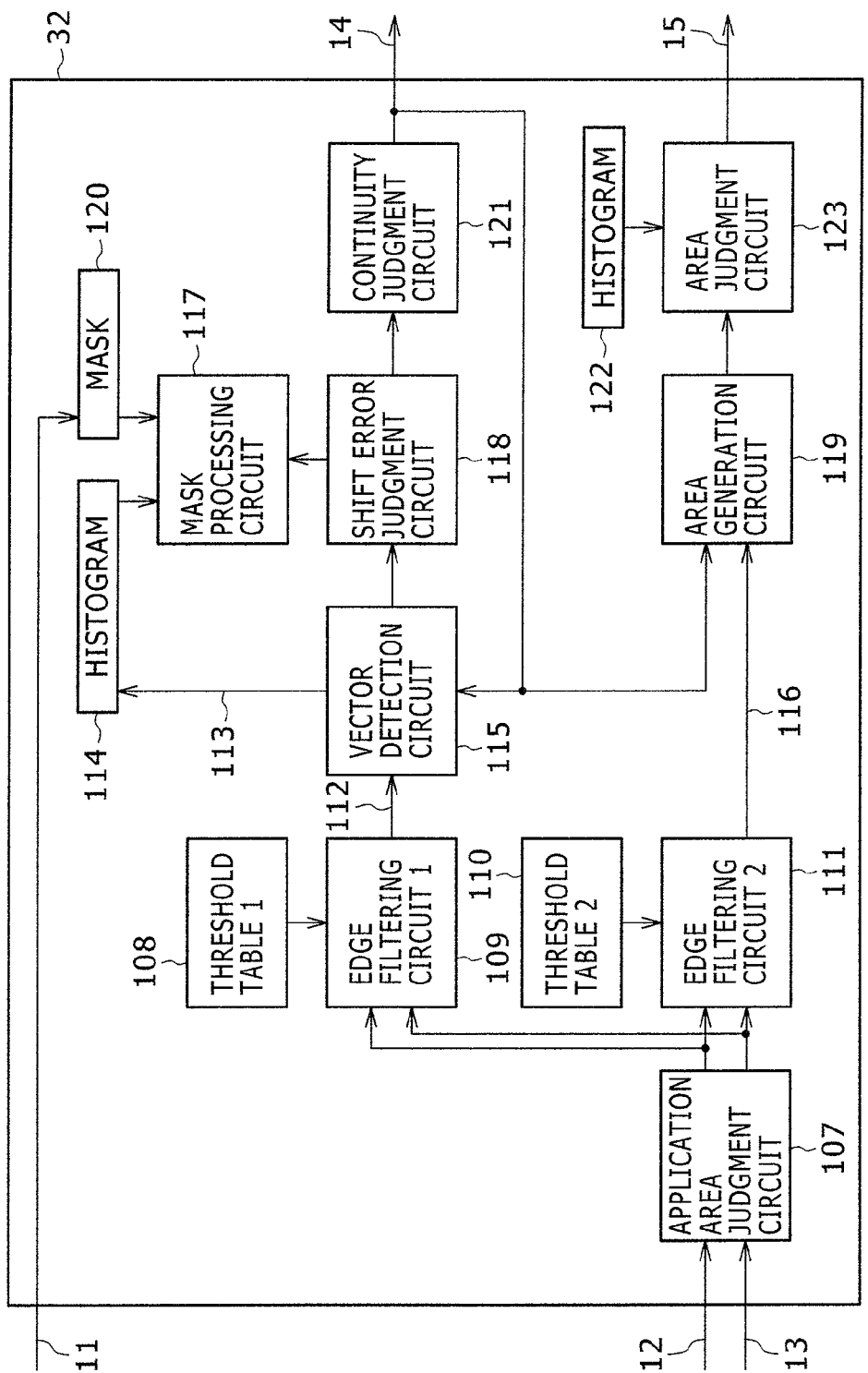
FIG. 2 is a block diagram illustrating a specific example of a second motion vector acquisition section 32 according to the first embodiment of the present invention.

Next, further details on the second motion vector acquisition section 32 of this embodiment are now provided with reference to FIG. 2. A previous frame signal 12 and a subsequent frame signal 13 from the frame buffer 2 are inputted to an application area judgment circuit 107, where a predetermined area is extracted from the previous and subsequent frame signals 12 and 13. Here, the predetermined area being extracted by the application area judgment circuit 107 is an area where telop characters for example are most likely to appear and is located near the bottom of an image. Suppose that processes following the judgment of an application area are carried out only on the extracted predetermined area by the application area judgment circuit 107 and are not carried out for the other areas.

A previous frame signal 12 and a subsequent frame signal 13 in the predetermined area the application area judgment circuit 107 has extracted are inputted to a first edge filtering circuit 109 and a second edge filtering circuit 111, respectively, so that an edge component in the predetermined area is filtered by each circuit. First, the first edge filtering circuit 109 detects a difference between a target pixel and its adjacent pixel (in any direction, horizontal or vertical) for each of the previous frame signal 12 and the subsequent frame signal 13 and filters an edge if the difference is greater than a first threshold stored in a first threshold table 108 and if brightness level of the target pixel is greater than a second threshold. In order for the first edge filtering circuit 109 to detect a second motion vector from its successive circuit, a threshold stored in the first threshold table 108 is set slightly high so that an infinitesimal change in brightness may not be detected as noise.

Similarly to the first edge filtering circuit 109, the second edge filtering circuit 111 detects a difference between a target pixel and its adjacent pixel (in any direction, horizontal or vertical) for each of the previous frame signal 12 and the subsequent frame signal 13 and filters an edge if the difference is greater than a first threshold stored in a second threshold table 110 and if brightness level of the target pixel is greater than a second threshold. In order for the second edge filtering circuit 111 to detect a specific area having telop characters, a grid pattern or a stripe pattern from its successive circuit, a threshold stored in the second threshold table 110 is set relatively lower than the threshold stored in the first threshold table 108.

Even though this embodiment suggested two edge filtering systems, it is for illustrative purposes only so only one of them may be used. That is, one edge filtering circuit and one threshold table may be sufficient to detect an edge component for detecting a motion vector and an edge component for deciding a specific area.

An edge component filtered by the first edge filtering circuit 109 is inputted to a motion vector detection circuit 115. The motion vector detection circuit 115 detects a motion vector of an image in an area designated by the application area judgment circuit 107, by performing a different process from the above-described matching process on the basis of respective edge components of the previous frame signal 12 and the subsequent frame signal 13. Further details on this motion vector detection are provided below, with reference to FIG. 9.

Figure 9:
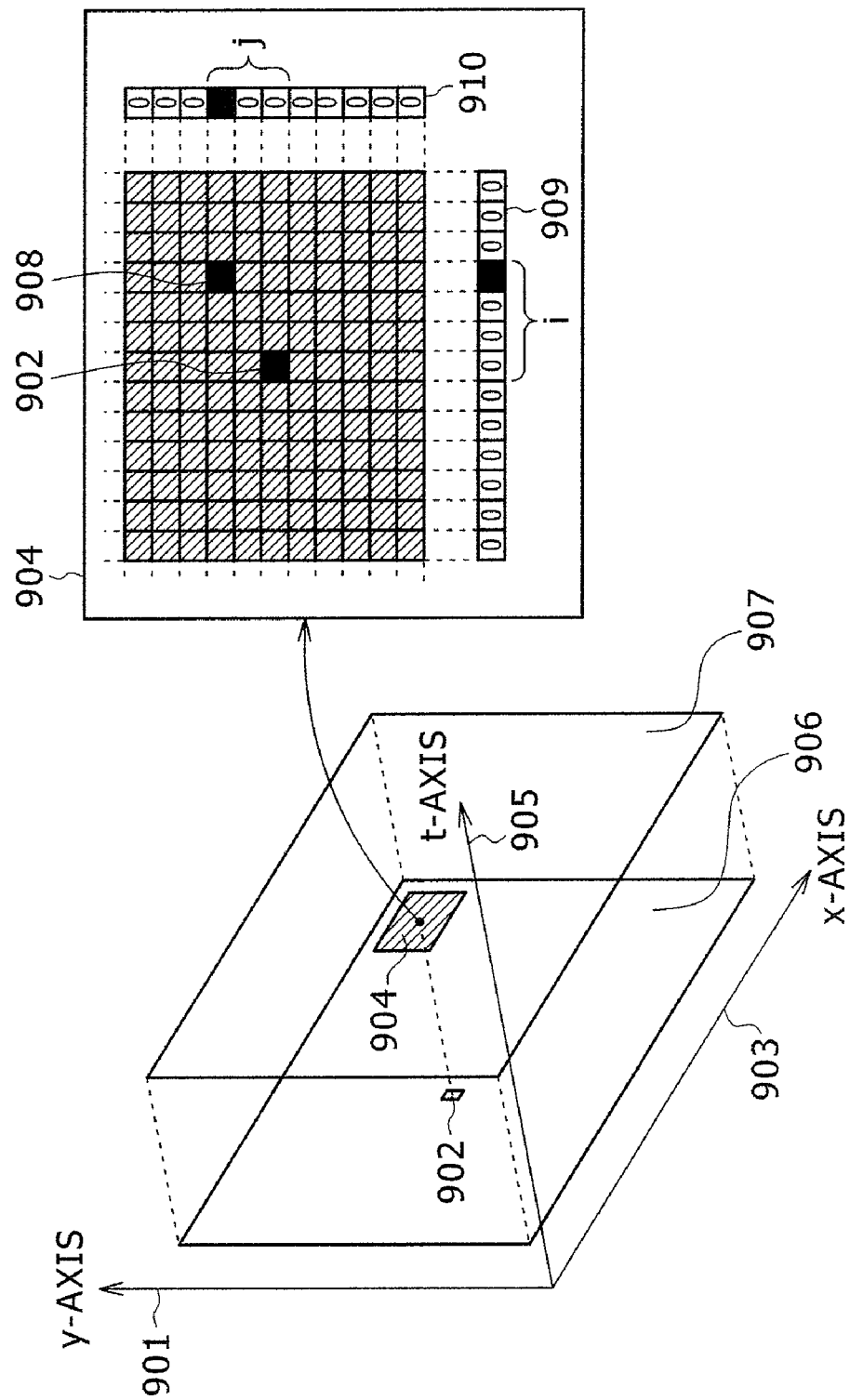
FIG. 9 is a diagram showing one example of coincidence point detection at the second motion vector acquisition section 32.

FIG. 9 diagrammatically illustrates temporally successive frames, in which y-axis 901 indicates the vertical direction, x-axis 903 indicates the horizontal direction, and t-axis 905 indicates the time direction. This illustrates the detection of an edge coincidence point by relatively shifting a first frame screen 906 which corresponds to the previous frame signal and a second frame screen 907 which corresponds to the subsequent frame signal in the horizontal and/or vertical direction by one pixel, i.e., shifting the second frame screen 907 in the horizontal and/or vertical direction by one pixel with respect to the first frame screen 906, to detect an edge coincidence on both frame screens. To implement this process, this embodiment has set a target pixel 903 on the first frame screen 906 to scan into a predetermined search domain 904 of the second frame screen 907. As depicted on the right-hand side of FIG. 9, the search domain 904 consists of ±6 pixels in the horizontal direction and ±5 pixels in the vertical direction with respect to the target pixel 902. Needless to say, the numbers of horizontal and vertical pixels in the search domain 904 given here are for illustrative purposes only, and the present invention is not limited thereto.

In this embodiment, the target pixel 902 (edge component) on the first frame screen 906 is sequentially compared with 143 pixels (13×11) (edge component) within the search domain 904 in order to search for a point having the same level as the target pixel 902 in the search domain 904. Suppose that a coincidence point 908 as a pixel both sides coincide is detected in the search domain 904. Then, the search for a coincidence point within the search domain 904 is conducted for the entire pixels on the first frame screen 906 (as mentioned earlier, these are pixels within a specific area designated by the application area judgment circuit 107). In this manner, a rough motion vector is obtained. In the example shown in FIG. 9, the coincidence point 908 is located from the target pixel 902 by 3 pixels to the right and 2 pixels up. That is, a shift quantity of the target pixel 902 becomes "3" to the right (or in the horizontal direction) and "2" in the vertical direction. Although the search domain 904 in this embodiment covers both horizontal and vertical directions, it can also cover one direction only.

Figure 10:
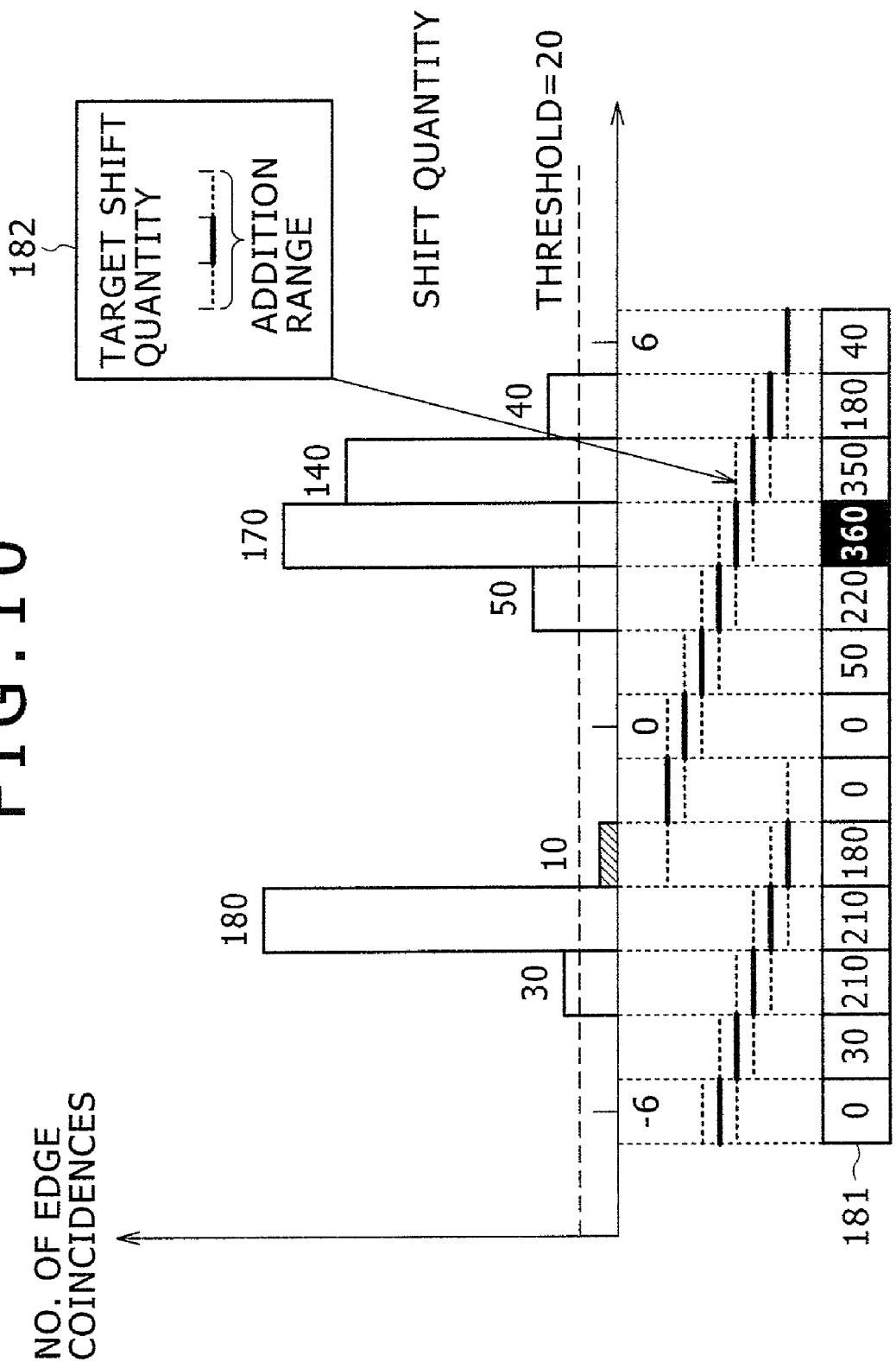
FIG. 10 shows one example of a histogram of the shift quantity at the second motion vector acquisition section 32.

Information about a motion vector detected by the motion vector detection circuit 115, i.e., information about a coincident point and information about an amount of misalignment (shift quantity) from a target pixel to a coincidence point, is inputted to a first histogram generation section 114. The first histogram generation section 114 plots a histogram similar to one shown in FIG. 10 expressing a count number of coincidence points appearing in terms of shift quantity (hereinafter, referred to as a histogram of shift quantity), based on the information on the coincidence point and shift quantity provided from the motion vector detection circuit 115. The concept associated with the histogram is shown in the enlarged view of the search domain on the right-hand side of FIG. 9. The first histogram generation section 114 has a horizontal coincidence point counter 909 and a vertical coincidence point counter 910. As depicted in FIG. 9, suppose that the target pixel 902 has coordinates (0,0). If the coincidence point 908 has coordinates (i,j)=(3,2), 3 being the quantity of horizontal shift and 2 being the quantity of vertical shift, the horizontal coincidence point counter 909 adds "1" to an address corresponding to the shift quantity +3, and the vertical coincidence point counter 910 adds "1" to an address corresponding to the shift quantity +2. The first histogram generation section 114 performs the coincidence point counting operation on all pixels within the predetermined area to compose a histogram of the shift quantity as shown in FIG. 10. In the interest of brevity and convenience in explanation, suppose that the histogram of shift quantity illustrated here specifies only the count number of coincidence points corresponding to a respective horizontal shift quantity. Needless to say, a histogram of vertical shift quantity has the same pattern as one shown in FIG. 10.

The histogram of shift quantity of FIG. 10 shows how many edge coincidence points appear in the case of moving the second frame screen 907 by one pixel with respect to the first frame screen 906. Here, the horizontal axis of the histogram represents the shift quantity and the vertical axis of the histogram represents the count number of edge coincidence points. Meanwhile, the horizontal axis corresponds to the horizontal dimension of the search domain 904 of FIG. 9 (in this example, ±6 pixels as the quantity of horizontal shift). As discussed before, the first histogram generation section 114 performs a counting operation of coincidence points on every target pixel on the first frame screen 906 of a specific area for every shift by one pixel within the search domain 904, to compose a histogram of shift quantity in the specific area designated by the application area judgment circuit 107. And the first histogram generation section 114 of this embodiment refers to the histogram of shift quantity and designates a shift quantity having the largest count number of coincidence points as a motion vector for pixels of the entire specific area, or a second motion vector.

In addition, a mask set-up circuit 120 receives the mask signal 11 mentioned earlier and sets up a mask area displaying an OSD screen such as a control board or menu screen. A mask processing circuit 117 operates in a manner that a histogram value for the mask area being set up by the mask set-up circuit 120 is excluded. Accordingly, the count number of coincidence points on the OSD screen does not affect the generation of a second motion vector. The mask set-up circuit 120 and the mask processing circuit 117 are not absolutely required but used optionally if needed.

Histogram information outputted from the mask processing circuit 17 is inputted to a shift error judgment circuit 118. It was described earlier that a shift quantity having the largest count number of coincidence points on the histogram of shift quantity was designated as a second motion vector. However, a second motion vector of interest can be determined more accurately by the following process in the shift error judgment circuit 118.

For example, in the case that the accuracy of an input image increases or decreases with respect to the input image to be matched with the resolution of the display panel 7, the input image undergoes a filtering operation to compose an interpolation pixel to be inserted to the input image. Therefore, pixels of the input image may become shaky before and after shift. Moreover, characters may be made transparent and blended with a background image. In these cases, edges of a character may not be filtered or filtering locations may be changed. Also, an image motion is not limited to the expression of an integer multiple number of pixel units such as 2 pixels, 3 pixels, etc., but can be expressed in a decimal number of pixel units such as 1.5 pixel, 3.7 pixels, etc. These pose a problem that an accurate motion vector cannot be obtained simply by obtaining a maximum value of histogram of shift quantity.

Even under these circumstances, however, the process by the shift error judgment circuit 118 as shown in FIG. 10 can be carried out to more accurately decide a second motion vector. That is, for an area histogram, a count number of coincidence points corresponding to a certain shift and a count number of coincidence points corresponding to a shift adjacent to that certain shift are added together to be designated as a true count number of coincidence points for the shift of interest. The concept of this addition is indicated by reference numeral 182 of FIG. 10.

For example, note a point with the shift quantity−3 in FIG. 10. The count number of coincidence points in that shift quantity has a value of "180" which is the largest count value in the histogram of quantity shift. If the problems aforementioned can be ignored, the shift quantity−3 would be designated as a motion vector. With the addition process, however, a motion vector is obtained differently as follows.

Referring again to FIG. 10, the count value of the shift quantity−2 and the count value of the shift quantity−4, each being adjacent to the shift quantity−3, are "10" and "30", respectively. Moreover, any count value below the threshold ("20" in this example) indicated by dotted line on the histogram of FIG. 10 is regarded as noise and thus excluded from the addition process. This means that the count value "10" of the shift quantity−2 is not included in the addition process, and an addition value with respect to the shift quantity−3 becomes "210" as shown in an addition table 181.

Note a point with the shift quantity+3 this time. The count number of coincidence points with the shift quantity has a value of "170". The count value of the shift quantity+2 and the count value of the shift quantity+4, each being adjacent to the shift quantity+3, are "50" and "140", respectively. Because neither count value exceeded the threshold, an addition value with respect to the shift quantity+3 becomes "360" as shown in the addition table 181.

Therefore, referring to the addition table 181, the shift error judgment circuit 118 determines a second motion vector in the specific area to be the shift quantity+3, not the shift quantity−3, because the addition value corresponding to the shift quantity+3 is the largest. This second motion vector indicates that an image of the specific area has shifted to right by three pixels from the previous frame over the subsequent frame.

The second motion vector thusly obtained is inputted to a continuity judgment circuit 121 that monitors a change in the second motion vector by 5 to 6 frames for example. If there are almost no changes in the size of the second motion vector throughout five frames, the continuity judgment circuit 121 decides that the motion vector is valid, and sends an output from the shift error judgment circuit 118 to the frame interpolation circuit 5 as the second motion vector 14 (see FIG. 1). Meanwhile, if the size of the second motion vector changes greatly throughout five frames, the continuity judgment circuit 121 decides that the detection of the second motion vector has not been done normally, so it outputs a previously obtained motion vector for example as the second motion vector 14 to the selector 4 (see FIG. 1). This continuity judgment circuit 121 is not absolutely required but used optionally if needed.

Next, the description on extraction of a specific area continues, referring back to FIG. 2. An edge component filtered by the second edge filtering circuit 111 is inputted to an area generation circuit 119 which extends or stretches the filtered edge component in a horizontal direction for example. Namely, the area generation circuit 119 seriates the edge component in the horizontal direction. As an edge component greater than the threshold stored in the second threshold table 110 is set to "1", and "0" for the other edge components, a binary value "1" occurs successively in the area through this stretching process. This area is used as a specific area. The stretching process continues down to a falling edge and does not end if a falling edge is not detected, e.g., until a count value of separately generated clocks reaches a predetermined value. Through this process, a specific area similar to one shown in FIG. 11 is formed.

Figure 11:
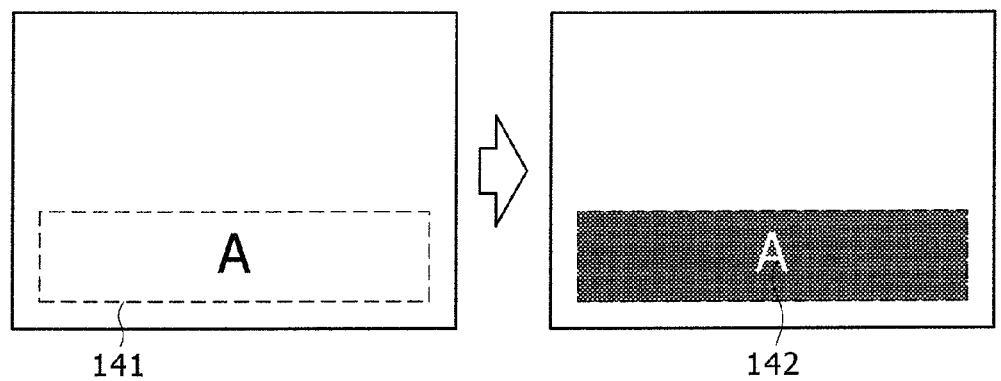
FIG. 11 illustrates one example of an extracted specific area.

The left side of FIG. 11 represents an input image signal, illustrating a case where a telop character "A" is displayed on a specific area 141 designated by the application area judgment circuit 107. Under this input signal, the area generation circuit 119 forms a specific area 142 (white character "A") shown on the right side of FIG. 11. In addition, the area generation circuit 119 receives a second motion vector via the continuity judgment circuit 121, and delays the specific area 142 according to the second motion vector to match the specific area 142 with the interpolation frame mentioned earlier. In the case that a frame rate converts from 60 Hz to 120 Hz, an interpolation frame is inserted between two successive original frames. Thus, a time interval between the interpolation frame and an original frame becomes half of a time interval between original frames. This leads to half of one frame period delay.

Compared with adjacent images, an image in a specific area that has a periodically or non-periodically appearing pattern (telop characters, a grid pattern, or a stripe pattern) in a direction with a change in brightness (this is regarded as a problem in this embodiment) has a clear edge (contour) and the color occupying the area is often of the same series. That is, the specific area exhibits a large gradation difference between pixels near the edge, while the inside the area exhibits a small gradation difference. This embodiment utilizes such a nature of the specific area to make the area generation circuit 119 generate a specific area 142. Here, a gradation difference between pixels sometimes varies by screen size or resolution. A gradation difference between two adjacent pixels changes because an image signal expands or reduces if image size or resolution between the image signal and the display signal 6 varies, thereby interpolating pixels or gradation levels. For example, when an image is enlarged twice by bilinear filtering, an interpolated pixel has a horizontal or a vertical mean value and the gradation difference tends to become narrow.

In order to cope with the above problem, the first and the second threshold hold data being stored in the second threshold table 110 may be set in advance based on the information that has a direct influence on pixels forming the edge such as the screen size or resolution. Such information includes an external input such as DVD image, broadcasting system or type such as digital Hi-Vision broadcast, and kind of an image filter being performed in a TV set. For example, if a high-resolution image of digital Hi-Vision broadcast needs to be displayed on a high-resolution display, the first threshold stored in the second threshold table 110 is set high (e.g., if an image signal has 256 gradation levels, the threshold is set to 100). On the other hand, if a low-resolution image of general broadcast needs to be magnified for display, the first threshold is preferably set lower (e.g., 50) than the previous one.

Figure 12:
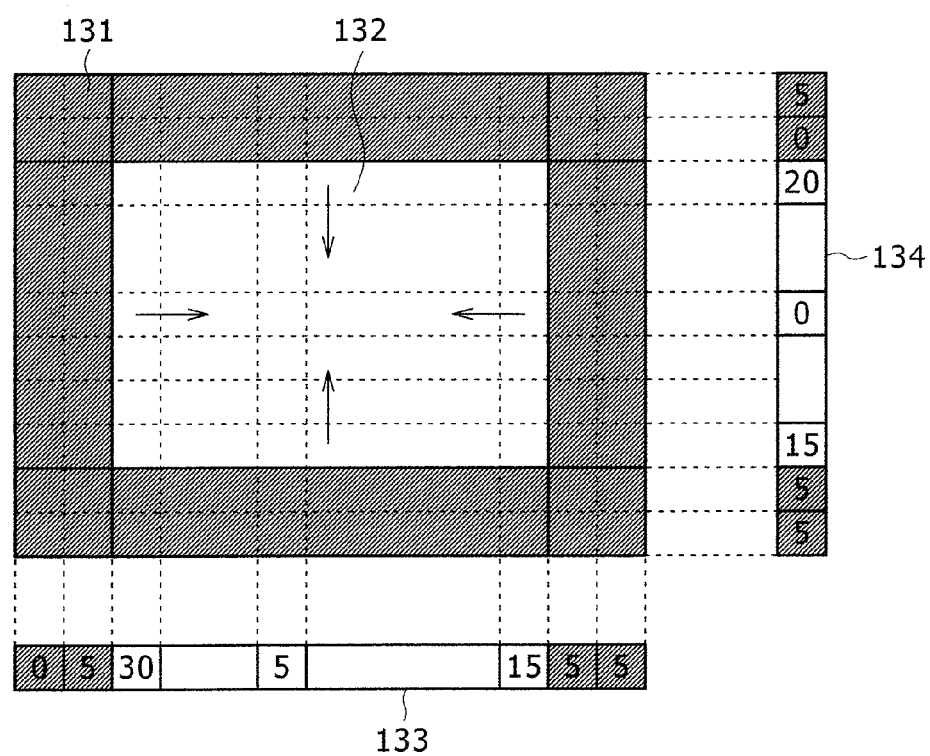
FIG. 12 illustrates one example of a histogram composed at a second histogram generation section.

The specific area 142 thus extracted by the area generation circuit 119 is inputted to the area judgment circuit 123. The area judgment circuit 123 uses the second histogram generation section 122 to compose a histogram in terms of spatial position of a specific area. An example of this histogram is shown in FIG. 12. This histogram includes a horizontal histogram 133 and a vertical histogram 134, and counts the number of pixels (i.e., pixels having the value "1") belonging to a specific area of a predetermined area 141. As shown in FIG. 12, the horizontal histogram 133 counts the number of pixels having the value "1" corresponding to horizontal positions, and the vertical histogram 134 counts the number of pixels having the value "1" corresponding to vertical positions. Here, if the count value is 5 or less, it indicates a noise component that is excluded from the specific area in a subsequent frame and becomes invalid. In the example shown in FIG. 12, a gray area is denoted as an invalid area 131. Meanwhile, a domain (or bin) with the count value from 15 to 30 on the horizontal histogram 133 and a domain with the count value from 15 to 30 and from 15 to 20 on the vertical histogram 134 are designated as a valid area 132, respectively. Therefore, the area judgment circuit 123 assigns the value "1" to all pixels within the valid area 132 and outputs an area identification signal 15 showing a specific area. This area identification signal 15, together with a second motion vector, is inputted to the selector 4 and used for the control of the selector 4 as explained before.

Figure 6:
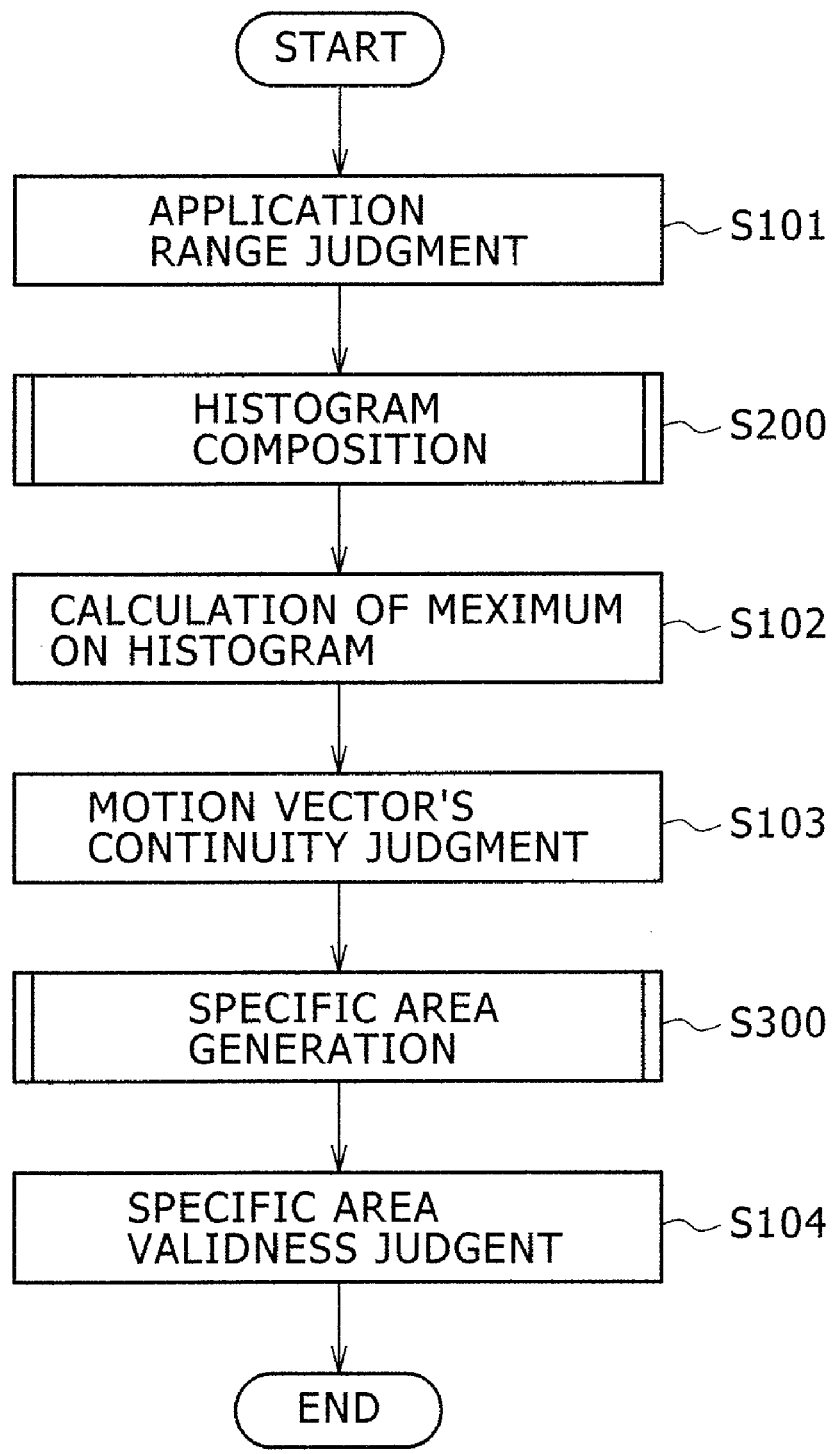
FIG. 6 is a flow chart describing a process at the second motion vector acquisition section 32 according to the first embodiment of the present invention.

The following describes a process flow in the second motion vector acquisition section 32, referring to FIG. 6. In step (hereinafter abbreviated to "S") 101, the application area judgment circuit 107 decides an area for the detection of the second motion vector and the extraction of a specific area. In S200, the first threshold table 108, the first edge filtering circuit 109, the vector detection circuit 115, and the first histogram generation section 114 detect coincidence points to compose a histogram of shift quantity. In S102, the mask set-up circuit 120, the mask processing circuit 117 and the shift error judgment circuit 118 compute a maximum value of a histogram and detect a second motion vector from the composed histogram of shift quantity. In S103, the continuity judgment circuit 122 monitors any change in the motion vector throughout 5 to 6 frames to judge the continuity of the motion vector. The continuity judgment is a process that applies a previous motion vector over a designated frame having been set up in advance if a motion vector is not extracted or if another motion vector is extracted.

In the following S300, the second threshold table 110, the second edge filtering circuit 111 and the area generation circuit 119 generate a specific area. Lastly in S104, as shown in FIG. 12, the second histogram generation section 122 and the area judgment circuit 123, the histogram of a specific area makes the continuous area below a predetermined threshold invalid. Meanwhile, the continuous area above the predetermined value becomes a valid area 132.

In this manner, the second motion vector 14 and a specific area to which the second motion vector 14 is applied are obtained.

Hereafter, an example of calculating the motion vector by expressions is described with reference to FIG. 9. An evaluation of image matching is generally made as follows. Suppose that gradation (or luminosity) of a present i-th frame at a position (x,y) is $S_i(x,y)$. Also, assume that a target pixel 902 positioned at (x,y) in the (k−1)th frame has shifted to a coincidence point 908 at (x+dx,y+dy) in the k-th frame. Then, a gradation difference of these two can be expressed by the following equation (1).

$$dS = S_k(x+dx, y+dy) - S_{k-1}(x,y) \quad (1)$$

Here, a displacement vector (dx,dy) having a minimum dS is a motion vector of interest.

Because this embodiment obtains a motion vector based on the coincidence of gradation difference using a pixel having a fixed gradation range $[S_0, S_1]$ and a pixel having a gradation between two adjacent pixels thereof above a threshold ($E_0$), the following equations (2) to (4) can be obtained.

$$dE = E_k((x+dx, y+dy) - E_{k-1}(x,y)) \quad (2)$$

$$E_i(x,y) = P_i(x,y) \text{grad } S_i(x,y) \quad (3)$$

$$P_i(x,y) = H(S_i(x,y) - S_0) H(S_1 - S_i(x,y)) H(\text{grad}|S_i(x,y)| - E_0) \quad (4)$$

wherein, H denotes the heavyside function (step function), and H(x) is 1 when x≧0; otherwise, 0.

Here, the equation (3) is a function expressing an edge of a specific area (hereinafter, this function is referred to as an edge function) and a motion vector of pixels in which a displacement vector (dx,dy) having the minimum dE forms an edge of a specific area.

In the case of satisfying |dE|<δE for any small threshold (δE (>0)) (hereafter, this condition is called 'Condition 1'), an edge at the position of the (k−1)th frame (x+dx,y+dy), coincides with an edge at the position of the k-th frame, (x,y).

The number of pixels counted in a frame by condition 1 becomes the number of pixels for a specific area, and the conditions of the equations (2) to (4) can be quantized by a substitution into the following equation (5).

$$N(dx, dy) = \Sigma_{x,y} H(\delta E - |dE|) \quad (5)$$

where, a displacement (dx,dy) having the maximum N is a motion vector of interest.

Figure 7:
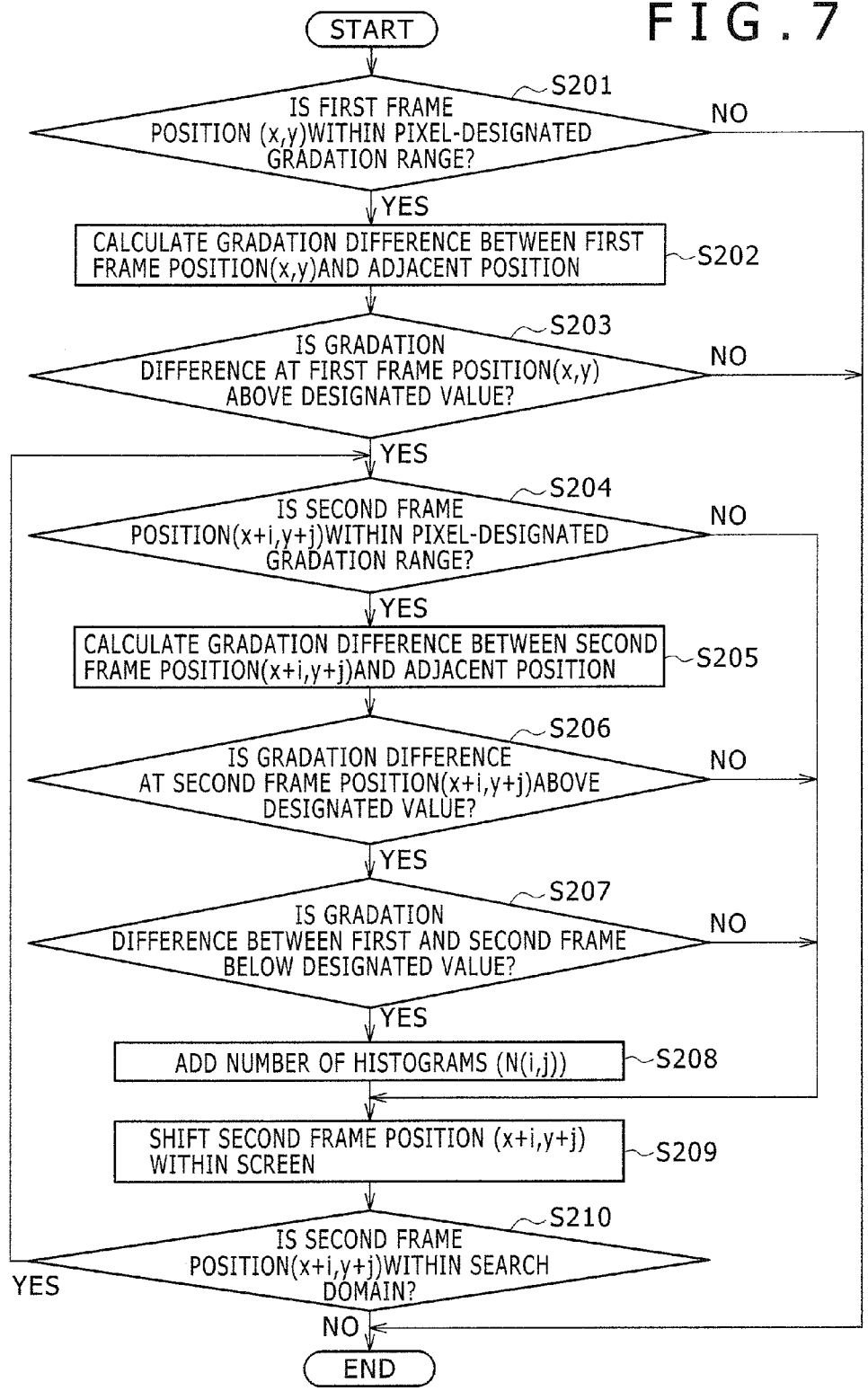
FIG. 7 is a flow chart describing a process at the second motion vector acquisition section 32 for acquiring a second motion vector.

The following describes an example of the second motion vector acquisition flow by an area histogram, with reference to FIG. 7. This corresponds to the process in S200 of FIG. 6. First of all, it is judged in S201 whether a pixel at the position (x,y) of the first frame falls within a designated gradation range. If Yes, the process proceeds to S202 to calculate a gradation difference between a pixel at the position (x,y) and its adjacent pixel. Further, in S203, it is judged whether the gradation difference calculated in S202 is greater than a designated value. If Yes, the process proceeds to S204 to judge whether a pixel at the position (x+i,y+j) of the second frame falls within a designated gradation range. If Yes, the process proceeds to S205 to calculate a gradation difference between a pixel at the position (x+i,y+j) and its adjacent pixel. In the meantime, if the judgment result in S201 and S202 is No, the process ends.

Here, if, in S201-S205, a pixel adjacent to the position (x,y) satisfies a gradation range $[S_0, S_1]$ and if gradation between two pixels adjacent to the δx or δy side is greater than a threshold ($E_0$) (hereinafter, these conditions are called 'Condition 2'), the equation (3) can be expressed as the following equation (6).

$$E_i(x,y) = \text{grad } S_i(x,y) = (\{S_i(x+\delta x) - S_i(x)\}/\delta x, \{S_i(y+\delta y) - S_i(y)\}/\delta y) \quad (6)$$

where, $P_i(x,y) = 1$

In addition, the equation (2) can be substituted into the following equation (7) by using the equation (6).

$$dE = \text{grad } S_k(x+dx, y+dy) - \text{grad } S_{k-1}(x,y) \quad (7)$$

Further, it is judged in S206 whether a calculation result from S205 is greater than a designated value, and if Yes, the process proceeds to S207.

Suppose that a present position (x+i,y+j) exists within the search domain 904 (x0,y0)−(x1,y1)(x0≦x≦x1, y0≦y≦y1). As the equation (7) shows a gradation difference between the position (x+i,y+j) of the (k−1)th frame and the position (x,y) of the k-th frame, a difference between the two frames is calculated in S207 to judge whether the difference is below a designated value. If the judgment result turns out to be Yes, the process proceeds to S208 to compose an area histogram. This is accomplished by performing the calculation based on the equation (5) on every pixel that satisfies the condition 2. As a result, an area histogram N(i,j) exhibiting the count number of edge coincidence points for every (i,j) pair within a bin is calculated. In this manner, the area histogram N(i,j) is calculated in S208, and a maximum is determined out of all (i,j) pairs to obtain a motion vector (i,j). Here, the area histogram N(i,j) satisfies 1≦i≦n and 1≦j≦m (n and m are integers).

Following the operation in S208, the process proceeds to S209 to shift the position (of a searching target pixel) within the search domain 904. In S210, it is judged whether the operations from S201 through 209 have been carried out for every pixel in the search domain 904, and repeats the operations of S201 to S209 until they are performed on all pixels. Meanwhile, if the judgment results in S204, S206, and S207 are No, the process proceeds to S209 to perform an operation corresponding to the step.

When a 2-D histogram is implemented into a real apparatus, (i×j) tables in rows and columns only increase the circuit size and the memory capacity, so it is better to approximate the 2-D histogram by the following equation (8).

$$N(n,m) \approx N(n,1) \cdot N(1,m) \quad (8)$$

Figure 8:
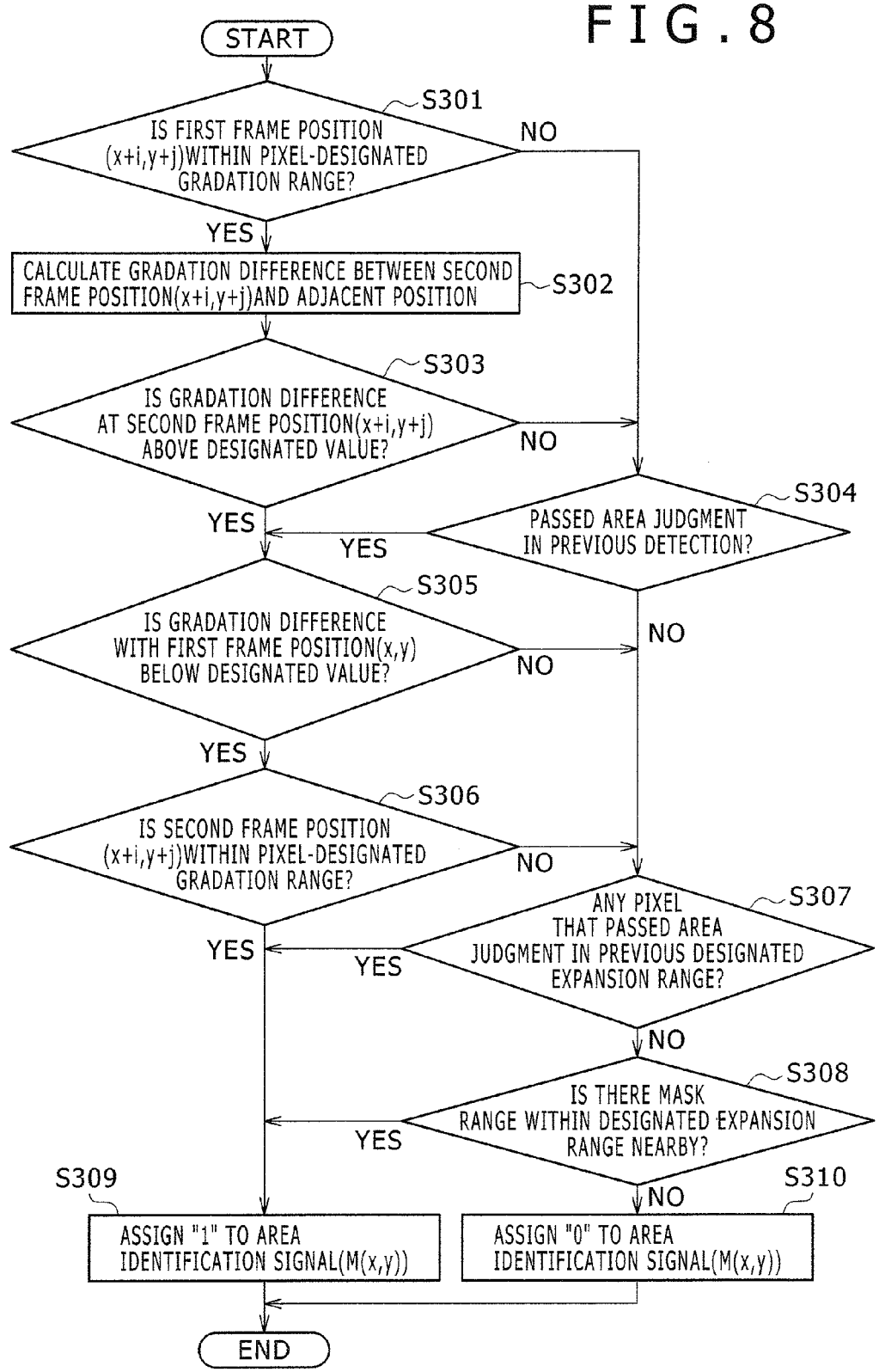
FIG. 8 is a flow chart describing a process at the second motion vector acquisition section 32 for judging a specific area.

Next, an example of the creation of a specific area signal 15 is explained with reference to FIG. 8. This corresponds to the operation of S300 shown in FIG. 6. First of all, in S301, it is judged whether a pixel at the position (x+i,y+j) of the second frame having been shifted by the detected motion vector (i,j) is within a predetermined gradation range $[S_0, S_1]$. If the judgment result is Yes, the process proceeds to S302 to obtain a gradation difference between a pixel at the position (x+i,y+j) and its adjacent pixel positioned on the δx or δy side. Then in S303 it is judged whether the gradation difference is greater than a threshold ($E_0$). An assumption is made that the condition 1 and the condition 2 described above differ in their gradation ranges and the thresholds for gradation. Meanwhile, conditions that satisfy S302 and S303 will be called 'Condition 3' hereinafter.

If the judgment result of S303 is Yes, it is judged in S305 whether a gradation difference between the position (x+i,y+j) of the second frame and the position (x,y) of the first frame is small. If Yes, the process proceeds to S306. On the other hand, if the judgment results of S301 and S303 are No, the process proceeds to S304 to decide whether the judgments in previous operations of S301 to S303 have been clear (i.e., whether the judgments results of S301 and S303 were Yes). If this judgment result turns out to be Yes, the process proceeds to S306. It is judged in S306 whether degradation of the pixel at the position (x+i,y+j) of the second frame falls within a designated range. If Yes, the process proceeds to S309 to decide that the pixel of this position exists in the specific area and assigns the value "1" to the area judgment signal M(x,y).

Meanwhile, if the judgment result of S304 is No, the process proceeds to S307 to judge whether there exists a pixel within the stretched area (a designated expansion range). If Yes, the process proceeds to S309. If No, however, the process proceeds to S308. It is judged in S308 whether a mask area exists within the designated expansion range. If No, the process proceeds to S310. In S310, the pixel is regarded as being outside the specific area, and the value "0" is assigned to the area judgment signal M(x,y). These operations in S304, S307, and S308 are for stretching (expanding) the specific area, provided that the conditions of each step have been satisfied.

As has been explained in this embodiment, if a specific area has an image pattern with a periodically or non-periodically appearing change in brightness, an interpolation frame is composed by using a histogram and a motion vector being detected. In this way, an erroneous detection rate of a motion vector in the specific area can be lowered, leading to a decrease in image degradation.

[Embodiment II]

A second embodiment of the invention will be described with reference to FIGS. 3 and 4A to 4C. In particular, the second embodiment shown in FIG. 3 is characterized by setting up plural the second motion vector acquisition sections 32 of FIG. 1 in parallel. In FIG. 3, constitutional elements indicated by the same reference numerals used in the first embodiment have the same functions, so details on them are omitted.

As mentioned above, the second embodiment features the use of a plural number (four to be specific) of the second motion vector acquisition sections 32a to 32d, and a mask synthesis circuit 303 is additionally provided to synthesize and output an output from each. This embodiment enables to generate a second motion vector 14 and an area identification signal 15 for a plurality of specific areas. Even though the second motion vector acquisition sections used in the first and the second embodiment are substantially the same in configuration, they differ as follows. That is, each of the second motion vector acquisition sections 32a to 32d of the second embodiment outputs a second motion vector 14 being obtained to one of the second motion vector acquisition sections 32a to 32d at a subsequent stage in processing through one of converters 301 to 302c. This feature makes the second motion vector acquisition sections distinctive from the second motion vector acquisition section 32 of the first embodiment. Also, it is assumed for this embodiment that the first motion vector acquisition section 31 and the frame interpolation circuit 5 are built in one unit.

In detail, the second motion vectors 14 in this embodiment are converted by the converters 301a to 302c into mask signals 302a to 302c, respectively, so that a histogram of shift quantity composed by a certain second motion vector acquisition section is not combined with another histogram of shift quantity composed by a different second motion vector acquisition section. As such, each of the second motion vector acquisition sections 32a to 32d provides a second motion vector 14a to 14d that corresponds to a predetermined area having been assigned thereto and an area designation signal 15a to 15d to the mask synthesis circuit 303. Then, the mask synthesis circuit 303 generates from these signals a synthesized second motion vector 304 and a synthesized area identification signal 305 and feeds them to the interpolation frame circuit 5.

Figure 4C:
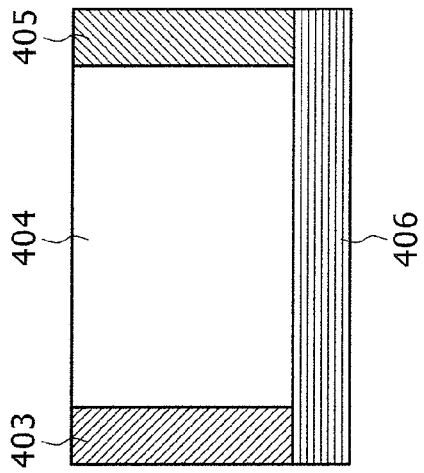
FIGS. 4A to 4C show one example of segmentation applied to the second embodiment of the present invention.
Figure 4A:
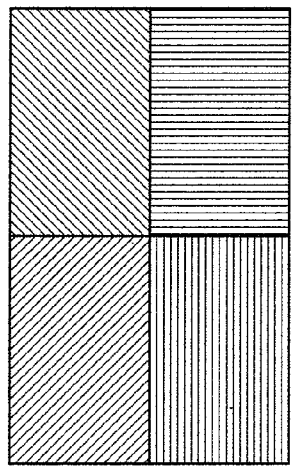
Figure 4B:
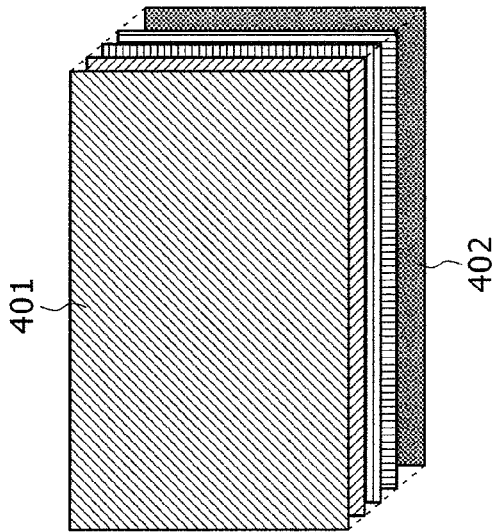

The following describes an example of the area designation implemented into the second embodiment, with reference to FIG. 4. Suppose that the area designation is carried out by an application range judgment circuit 107 in each of the second motion vector acquisition sections 32. In order to designate plural areas, a screen may be spatially divided into four defined areas as shown in FIG. 4A (the areas are arranged in a row on the same space), or temporally divided into four as shown in FIG. 4B (i.e., the areas are overlapped one another). In the former case, a motion vector and other areas are not in a co-dependent relationship, so the converters 301a to 301d become null. In the latter case, the converters 301a to 301c have to be available not to detect the same motion vector for the same target. However, in the case of changing a specific area, that is, when the first threshold table 108 and the second threshold table 110 change, the co-dependent relationship disappears so the converters 301a to 301c may become null.

In addition, as shown in FIG. 4C, the screen may be divided into several areas: the areas 403 and 405 on both sides for vertical subtitle display, the area 406 on the bottom for horizontal subtitle display, and the general use area 404 covering the entire areas. As such, if the area overlapping method and the area arrangement method are used in combination, this also affect the respective second motion vector acquisition section corresponding to each area and the first histogram generation section 114 by the co-dependent relationship. In this case, the converts 301a and 301b are made null, while leaving the converter 301c available. The general use area 404 is assigned to the second motion vector acquisition section 32d for use. Moreover, the first histogram generation section may plot a histogram with N(m,1) for the areas 403 and 405, N(m,1) for the area 406, and N(m,1)N(m,1) for the area 404, thereby reducing the circuit size.

As discussed earlier, the area judgment signals 15a to 15d outputted from the respective second motion vector acquisition sections are one-bit signals for designating an area to which a motion vector is applied, or an area to which a motion vector is not applied. Therefore, the synthesized mask area signal 305 generated by the mask synthesis circuit 303 have the same number of bits as the count number of the second motion vector acquisition sections. In this embodiment, since there are four of the second motion vector acquisition sections, the synthesized mask signal 305 is a four-bit signal. Since the areas shown in FIG. 4A are mutually exclusive one another, the frame interpolation circuit 5 memorize each of the four areas to generate a one-bit signal. In the case of FIG. 4C, a synthesized mask signal becomes a two-bit signal.

As has been explained so far, according to this embodiment, an area including an image pattern with a periodically or non-periodically appearing change in brightness such as a grid pattern, a stripe pattern, telop characters, etc., is designated as a specific area, and a motion vector is acquired for the specific area not by the matching process but based on a relative misalignment of edge components between two frames. Further, a histogram showing a relation between shift quantity and motion vector is plotted, and a motion vector having the highest number of times or occurrence on the histogram is set as a motion vector for the specific area. Therefore, according to this embodiment, the frame conversion technology in use of an interpolation frame makes it possible to display a high picture quality image with less jitter or break-ups even including an image pattern where change in brightness such as a grid pattern, a stripe pattern and so on appears periodically or non-periodically.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An image display apparatus, comprising:
   a first motion vector acquisition section for acquiring and outputting an image motion vector in pixel or a predetermined block unit from plural frames included in an input image signal;
   a second motion vector acquisition section including an edge filtering section for filtering a predetermined edge component from the input image signal, and acquiring a motion vector for the specific area by utilizing the predetermined edge component filtered by the edge filtering section;
   a frame interpolation section for generating an interpolated frame by using the motion vector provided by the second motion vector acquisition section and for combining the interpolated frame with a frame of the input image signal, thereby composing a signal of a new frame sequence; and
   a display section for displaying an image based on the frame sequence outputted from the frame interpolation section,
   wherein the first motion vector acquisition section gives a different motion vector to areas other than a specific area of a frame in the input image signal; and
   wherein the frame interpolation unit shifts the two frames in a horizontal and/or vertical direction in a predetermined pixel unit and detects the number of times or frequency the predetermined edge components coincide with each other between the two frames to compose a histogram, and designates a shift quantity having a greatest number of the edge component coincidences on the histogram as a motion vector for the specific area.

2. An image processor comprising:
   a first motion vector acquisition unit to acquire a first motion vector by motion detection based on a differential value between plural pixels or blocks between plural frames included in an input image signal;
   a second motion vector acquisition unit to filter an edge component consisting of pixels satisfying predetermined threshold conditions from the plural frames included in the input image signal and to acquire a second motion vector on the basis of a number of the pixels whose pixel level coincides with each other for a relative position between the plural frames on the edge component consisting of the pixels satisfying the predetermined threshold conditions; and
   a frame interpolation unit to perform interpolation with the plural frames included in the input image signal and one of the first and second motion vectors in use so as to generate an interpolated frame,
   wherein the frame interpolation unit performs the interpolation with the second motion vector in use for a rectangular specific area defined on the basis of the number in horizontal and vertical directions respectively of the pixels internally included in the edge component consisting of the pixels satisfying the predetermined threshold conditions, whereas performing the interpolation with the first motion vector in use for areas other than the specific area.

3. The image processor according to claim 2, wherein the acquisition of the second motion vector is made on a basis of a histogram on the number of the pixels whose pixel level coincides with each other for the relative position between the plural frames on the edge component consisting of the pixels satisfying the predetermined threshold conditions.

4. The image processor according to claim 2, wherein the acquisition of the second motion vector is made on the basis of the relative position having the greatest number of the pixels in the histogram, on the number of the pixels whose pixel level coincides with each other for the relative position between the plural frames on the edge component consisting of the pixels satisfying the predetermined threshold conditions.

5. The image processor according to claim 4, wherein in the histogram on the number of the pixels whose pixel level coincides with each other for the relative position between the plural frames on the edge component consisting of the pixels satisfying the predetermined threshold conditions, an OSD (on screen display) portion is excluded from the number of the pixels.

6. The image processor according to claim 2, wherein the pixels satisfying the predetermined threshold conditions correspond to those whose difference with adjacent pixels is more than a first threshold, as well as whose brightness level is more than a second threshold.

7. The image processor according to claim 2, wherein the specific area is defined by comparing the number in horizontal and vertical directions respectively of the pixels internally included in the edge component consisting of the pixels satisfying the predetermined threshold conditions with predetermined thresholds.

8. The image processor according to claim 2, wherein the acquisition of the first motion vector comprises operations of:
filtering plural pixel or block pairs that are point symmetric on the plural frames included in the input image signal with respect to an interpolated pixel or block inside the interpolated frame; and designating a direction of the pixel or block pair having a smallest difference therebetween as the first motion vector.

9. The image processor according to claim 2, wherein an image pattern in the specific area comprises a grid pattern, a stripe pattern or telop characters.

10. An image display apparatus comprising:
a first motion vector acquisition unit to acquire a first motion vector by motion detection based on a differential value between plural pixels or blocks between plural frames included in an input image signal;
a second motion vector acquisition unit to filter an edge component consisting of pixels satisfying predetermined threshold conditions from the plural frames included in the input image signal, and to acquire a second motion vector on a basis of a number of the pixels whose pixel level coincides with each other for a relative position between the plural on the edge component consisting of the pixels satisfying the predetermined threshold conditions;
a frame interpolation unit to perform interpolation with the plural frames included in the input image signal and one of the first and second motion vectors in use so as to generate an interpolated frame; and
an image display unit to display the interpolated frame generated by the frame interpolation unit,
wherein the frame interpolation unit performs the interpolation with the second motion vector in use for a rectangular specific area defined on the basis of the number in horizontal and vertical directions respectively of the pixels internally included in the edge component consisting of the pixels satisfying the predetermined threshold conditions, whereas performing the interpolation with the first motion vector in use for areas other than the specific area.

11. The image display apparatus according to claim 10, wherein the acquisition of the second motion vector is made on the basis of a histogram on the number of the pixels whose pixel level coincides with each other for the relative position between the plural frames on the edge component consisting of the pixels satisfying the predetermined threshold conditions.

12. The image display apparatus according to claim 10, wherein the acquisition of the second motion vector is made on the basis of the relative position having the greatest number of the pixels in the histogram on the number of the pixels whose pixel level coincides with each other for the relative position between the plural frames on the edge component consisting of the pixels satisfying the predetermined threshold conditions.

13. The image display apparatus according to claim 12, wherein in the histogram on the number of the pixels whose pixel level coincides with each other for the relative position between the plural frames on the edge component consisting of the pixels satisfying the predetermined threshold conditions, an OSD (on screen display) portion is excluded from the number of the pixels.

14. The image display apparatus according to claim 10, wherein the pixels satisfying the predetermined threshold conditions correspond to those whose difference with adjacent pixels is more than a first threshold, as well as whose brightness level is more than a second threshold.

15. The image display apparatus according to claim 10, wherein the specific area is defined by comparing the number in horizontal and vertical directions respectively of the pixels internally included in the edge component consisting of the pixels satisfying the predetermined threshold conditions with predetermined thresholds.

16. The image display apparatus according to claim 10, wherein the acquisition of the first motion vector comprises operations of: filtering plural pixel or block pairs that are point symmetric on the plural frames included in the input image signal with respect to an interpolated pixel or block inside the interpolated frame; and designating a direction of the pixel or block pair having a smallest difference therebetween as the first motion vector.

17. The image display apparatus according to claim 10, wherein an image pattern in the specific area comprises a grid pattern, a stripe pattern or telop characters.

* * * * *